United States Patent
Kim et al.

(10) Patent No.: US 7,479,052 B2
(45) Date of Patent: Jan. 20, 2009

(54) METHOD OF GROWING CARBON NANOTUBES AND METHOD OF MANUFACTURING FIELD EMISSION DEVICE USING THE SAME

(75) Inventors: Ha-Jin Kim, Suwon-si (KR); In-Taek Han, Seoul (KR)

(73) Assignee: Samsung SDI Co., Ltd., Suwon-si, Gyeonggi-do (KR)

(*) Notice: Subject to any disclaimer, the term of this patent is extended or adjusted under 35 U.S.C. 154(b) by 380 days.

(21) Appl. No.: 11/476,653

(22) Filed: Jun. 29, 2006

(65) Prior Publication Data

US 2008/0311818 A1 Dec. 18, 2008

(30) Foreign Application Priority Data

Dec. 13, 2005 (KR) ............... 10-2005-0122426

(51) Int. Cl.
*H01J 9/00* (2006.01)
*D01F 9/12* (2006.01)
*C23C 16/00* (2006.01)

(52) U.S. Cl. .............. 445/50; 977/876; 423/447.3

(58) Field of Classification Search ......... 445/23–25, 445/50, 51; 977/876, 843; 427/569, 248.1; 423/447.3
See application file for complete search history.

(56) References Cited

OTHER PUBLICATIONS

U.S. Appl. No. 11/476,654, filed Jun. 29, 2006, Kim et al.

*Primary Examiner*—Joseph L Williams
(74) *Attorney, Agent, or Firm*—Robert E. Bushnell, Esq.

(57) ABSTRACT

Methods of growing carbon nanotubes and manufacturing a field emission device using the carbon nanotubes are provided. The method of growing carbon nanotubes includes the steps of preparing a substrate, forming a catalyst metal layer on the substrate to promote the growing of the carbon nanotubes, forming an amorphous carbon layer on the catalyst metal layer where the amorphous carbon layer partially covers the catalyst metal layer, and growing the carbon nanotubes from a surface of the catalyst metal layer. The carbon nanotubes are grown in a portion of the surface of the catalyst metal layer that is not covered by the amorphous carbon layer. In the method of growing carbon nanotubes, the carbon nanotubes are grow at a low temperature. A density of carbon nanotubes can be controlled to improve field emission characteristics of an emitter of a field emission device.

24 Claims, 6 Drawing Sheets

METHOD OF GROWING CARBON NANOTUBES AND METHOD OF MANUFACTURING FIELD EMISSION DEVICE USING THE SAME

CLAIM OF PRIORITY

This application makes reference to, incorporates the same herein, and claims all benefits accruing under 35 U.S.C. § 119 from an application for METHOD FOR GROWING CARBON NANOTUBES AND MANUFACTURING METHOD OF FIELD EMISSION DEVICE THEREWITH, earlier filed in the Korean Intellectual Property Office on Dec. 13, 2005 and there duly assigned Serial No. 10-2005-0122426.

BACKGROUND OF THE INVENTION

1. Field of the Invention

The present invention relates to a method of growing carbon nanotubes and a method of manufacturing a field emission device using the same, and more particularly, to an inexpensive method of growing carbon nanotubes, where the carbon nanotubes can be grown at a low temperature with a suitable density for an emitter of a field emission device, and an inexpensive method of manufacturing a field emission device using the same, in which the field emission device can be constructed to have superior electron emission characteristics, and damage to a thin film can be reduced during a thermal process.

2. Description of the Related Art

Carbon nanotubes have drawn attention as an electron emission source, that is, an emitter of a field emission device. Methods of forming carbon nanotubes include thermal chemical vapor deposition (CVD), arc discharge, laser ablation, plasma enhanced chemical vapor deposition (PECVD), etc.

In the thermal CVD method, a catalyst metal layer is first formed on an electrode that is formed on a substrate, and then carbon nanotubes are grown on a surface of the catalyst metal layer by injecting a carbon containing gas such as methane ($CH_4$), acetylene($C_2H_2$), ethylene($C_2H_4$), ethane ($C_2H_6$), carbon monoxide (CO), or carbon dioxide ($CO_2$) together with hydrogen ($H_2$) gas, nitrogen ($N_2$) gas, or argon (Ar) gas into a reactor, which is maintained at a temperature of 500° C. to 900° C.

Recently, as the size of a field emission device increases, the size of a substrate also becomes larger. A glass substrate may be used as the substrate, because a glass substrate of a large size can be easily made or obtained. Typical glass such as sodalime glass, however, softens at temperature of approximately 480° C. Therefore, it is difficult to use the glass substrate in an in situ process which requires temperature greater than 500° C. for growing the carbon nanotubes. Accordingly, when glass is used as the substrate, either an expensive high temperature glass should be used, or the carbon nanotubes should be moved one by one to desired locations on the glass substrate after the carbon nanotubes are grown in a separate process.

Even though a high temperature glass is used as a substrate material, thin films formed on the substrate such as a gate electrode insulating layer can be peeled off or damaged due to thermal stresses generated between thin films or between a thin film and the substrate, because temperature greater than 500° C. is applied to the glass substrate to grow carbon nanotubes by an in situ process. Therefore, it is difficult to manufacture a commercial large size field emission device using the thermal CVD method due to above mentioned or other reasons. In PECVD method, carbon nanotubes are grown in the similar processes described above, and a catalyst metal is used to grow carbon nanotubes.

Generally, when carbon nanotubes are used to form an emitter of a field emission device, the field enhancement decreases as the gap between the carbon nanotubes decreases, and thus the current density is rapidly reduced. Accordingly, field emission characteristics of the field emission device can be improved by reducing the density of the carbon nanotubes to an appropriate level in growing of carbon nanotubes for an electron emission source of a field emission device.

SUMMARY OF THE INVENTION

The present invention provides a method of growing carbon nanotubes at a low temperature. The present invention also provides a method of growing carbon nanotubes that is able to control the density of the carbon nanotubes. The present invention also provides a method of growing carbon nanotubes at low costs. The present invention also provides a method of manufacturing a field emission device, which can prevent damages of thin films such as a gate electrode insulating film during a thermal process. The present invention also provides an inexpensive method of manufacturing a large size field emission device by growing carbon nanotubes at a low temperature, and provides a method of manufacturing a field emission device having superior field emission characteristics by controlling the density of carbon nanotubes of the emitter.

According to an aspect of the present invention, there is provided a method of growing carbon nanotubes. The method includes steps of preparing a substrate, forming a catalyst metal layer on the substrate to promote growing of the carbon nanotubes, forming an amorphous carbon layer on the catalyst metal layer where the amorphous carbon layer partially covers the catalyst metal layer; and growing carbon nanotubes from a surface of the catalyst metal layer where the carbon nanotubes grow on a portion of the surface of the catalyst metal layer that is not covered by the amorphous carbon layer.

The method may further includes a step of forming a silicon (Si) layer on the substrate between the steps of preparing the substrate and forming of the catalyst metal layer.

According to an aspect of the present invention, there is provided a method of manufacturing a field emission device. The method includes steps of preparing a panel that includes a substrate, a negative electrode formed on the substrate, a gate electrode insulating layer formed on the negative electrode, and a gate electrode formed on the gate electrode insulating layer, forming a well through the gate electrode and the gate electrode insulating layer until the negative electrode is exposed at a bottom of the well, forming a catalyst metal layer on the negative electrode, forming an amorphous carbon layer on the catalyst metal layer where the amorphous carbon layer partially covers the catalyst metal layer, and forming a carbon nanotube emitter by growing carbon nanotubes from surfaces of the catalyst metal layer where the carbon nanotubes grow on a portion of the surface of the catalyst metal layer that is not covered by the amorphous carbon layer.

According to another aspect of the present invention, there is provided a method of manufacturing a field emission device. The method includes steps of preparing a panel that includes a substrate, a negative electrode formed on the substrate, a silicon layer formed on the negative electrode, a gate electrode insulating layer formed on the silicon layer, and a gate electrode formed on the gate electrode insulating layer, forming a well through the gate electrode and the gate electrode insulating layer until the silicon layer is exposed at a bottom of the well, forming a catalyst metal layer on the silicon layer, forming an amorphous carbon layer on the catalyst metal layer where the amorphous carbon layer partially covers the catalyst metal layer, and forming a carbon nanotube emitter by growing carbon nanotubes from a surface of the catalyst metal layer where the carbon nanotubes grow on a portion of the surface of the catalyst metal layer that is not covered by the amorphous carbon layer.

The substrate may be made of glass. The carbon nanotubes may be formed using a thermal CVD method. The amorphous carbon layer formed on the catalyst metal layer may be formed by carbonizing the catalyst metal layer, which is a carbonization process. The carbonization process may be performed under an atmosphere of gas mixture in which carbon monoxide (CO) gas and hydrogen ($H_2$) gas are mixed in a predetermined ratios. The carbonization process may be performed at a temperature of 300° C. to 450° C. for 5 minutes to 60 minutes.

The carbonization process and the carbon nanotubes growing process may be isothermally performed, and a process of increasing and decreasing the temperature before and after the carbonization process and the carbon nanotube growing process may be performed under an atmosphere of nitrogen ($N_2$) gas. The carbon nanotubes may be grown at a temperature of 350° C. to 450° C. for 5 minutes to 60 minutes. The catalyst metal layer may be made of a material such as nickel (Ni), iron (Fe), cobalt (Co), platinum (Pt), molybdenum (Mo), tungsten (W), yttrium (Y), gold (Au), palladium (Pd), or alloys these materials. The catalyst metal layer may be formed by a magnetron sputtering method or an electron beam evaporation method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE INVENTION

The present invention will now be described in more detail with reference to the accompanying drawings in which exemplary embodiments of the invention are shown.

Figure 1A:
FIG. 1A is a plan view of a dummy region of a field emission device having a carbon nanotubes emitter formed using a CVD method.
Figure 1B:
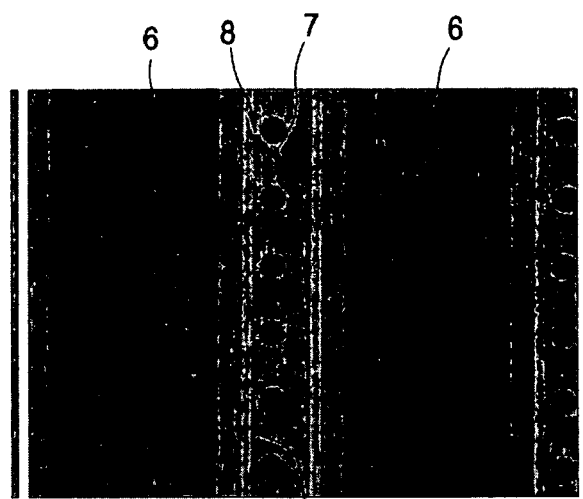
FIG. 1B is a plan view of a display region of the field emission device of FIG. 1A.
Figure 1C:
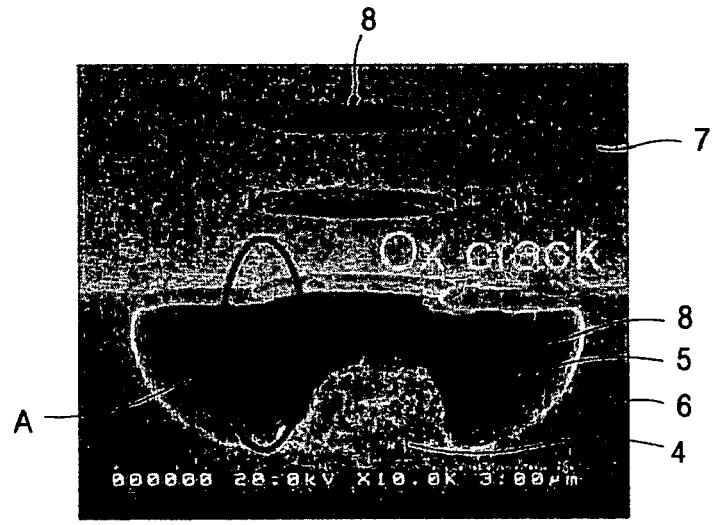
FIG. 1C is a scanning electron microscope (SEM) image of a cross-sectional view of a display region of the field emission device of FIG. 1A.

FIG. 1A is a plan view of a dummy region of a field emission device having a carbon nanotube emitter formed using a CVD method. FIG. 1B is a plan view of a display region of the field emission device of FIG. 1A, and FIG. 1C is a scanning electron microscope (SEM) image of a cross-sectional view of a display region of the field emission device of FIG. 1A.

As depicted in FIG. 1A, when carbon nanotubes are grown on a catalyst metal layer (not shown) of a substrate (not shown) using an in situ process of a CVD method, crack A is generated in gate electrode insulating film 6 formed between the substrate and a gate electrode (not shown). Also, in this case, as depicted in FIG. 1B, crack A formed in gate electrode insulating film 6 extends to gate electrode 7, and causes another crack B in gate electrode 7 around well 8. FIG. 1C shows crack A formed in gate electrode insulating film 6 that is extended into an inner wall as well as a surface of well 8. Catalyst metal layer 4 and carbon nanotubes 5 grown on catalyst metal layer 4 are located on a lower part of well 8. Therefore, it is necessary to provide a method of growing carbon nanotubes that prevent the crack on the gate electrode insulating film and on the surface of the well.

Figure 2A:
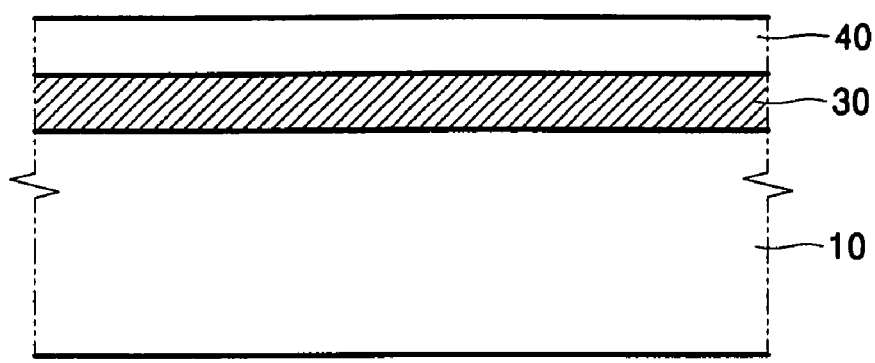
FIGS. 2A through 2C are cross-sectional views for illustrating a method of growing carbon nanotubes according to the principles of the present invention.
Figure 2B:
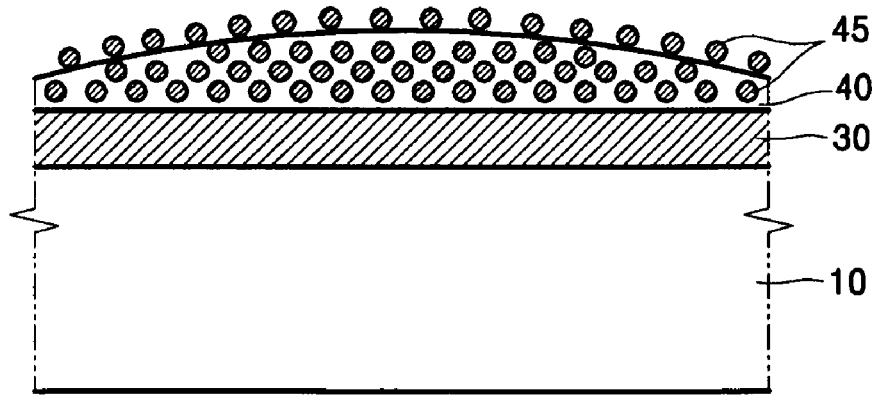
Figure 2C:
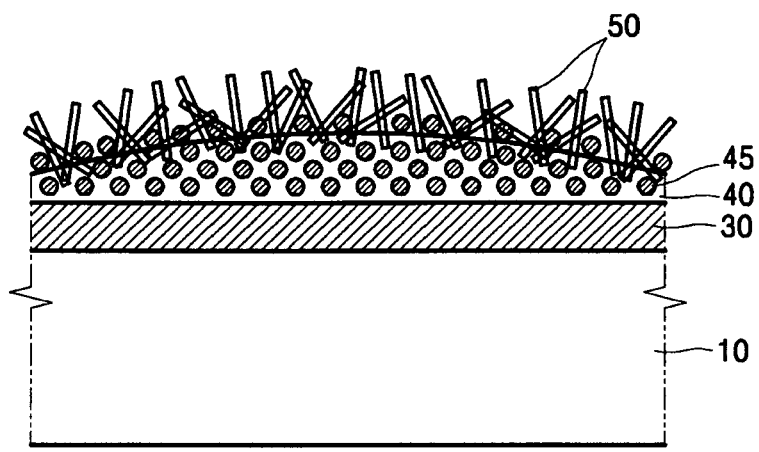
Figure 3:
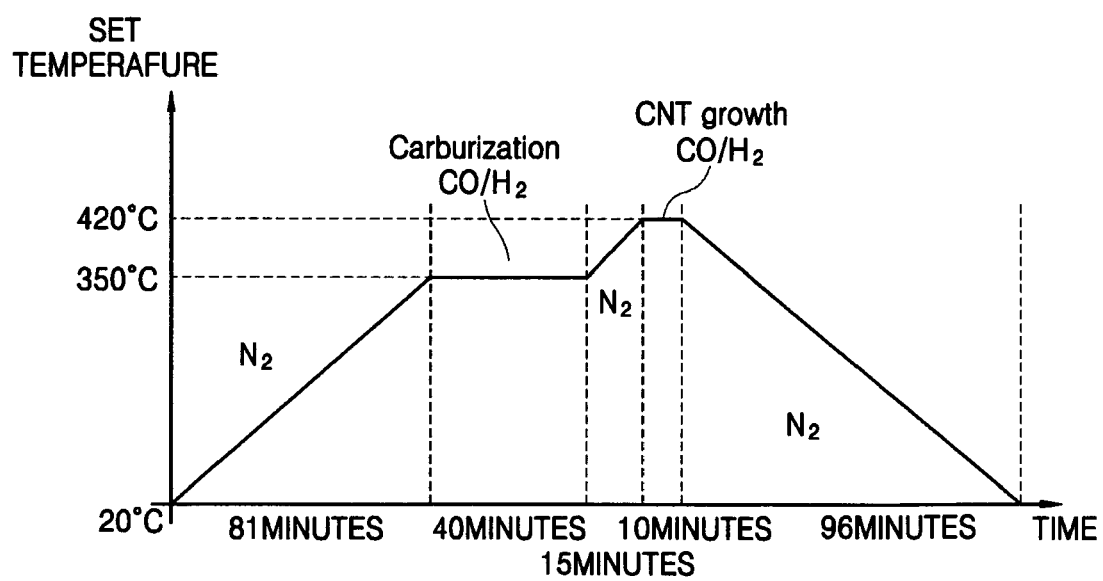
FIG. 3 is a graph showing a reaction condition of a CVD method according to the principles of the present invention.

FIGS. 2A through 2C are cross-sectional views for illustrating a method of growing carbon nanotubes according to the principles of an embodiment of the present invention. FIG. 3 is a graph showing a reaction condition of a CVD method disclosed as an embodiment of the present invention.

Referring to FIG. 2A, silicon (Si) layer 30 is formed on an upper surface of substrate 10, and catalyst metal layer 40 is formed on silicon layer 30. Substrate 10 may be made of glass, but the substrate in the present invention is not limited to a glass substrate. Substrate 10 can be made of any material that is durable in a CVD process without deformation. Silicon layer 30 can be made of amorphous silicon, crystalline silicon, or other form of silicon. However, in some cases, silicon layer 30 may not be necessary. In this case, catalyst metal layer 40 is directly formed on substrate 10.

Catalyst metal layer 40 can be formed by depositing a metal such as nickel (Ni), iron (Fe), cobalt (Co), platinum (Pt), molybdenum (Mo), tungsten (W), yttrium (Y), gold (Au), palladium (Pd), or alloys of these metals on a surface of silicon layer 30 or substrate 10. Catalyst metal layer 40 have carbon nanotubes grow vertically on a surface of catalyst metal layer 40 during a CVD process. Catalyst metal layer 40 may be formed by a magnetron sputtering method or an electron beam evaporation method.

After catalyst metal layer 40 is formed on silicon layer 30 or on substrate 10, as depicted in FIG. 2B, amorphous carbon layer 45 is formed on catalyst metal layer 40 by carbonizing catalyst metal layer 40. The process of carbonizing catalyst metal layer 40 is referred to as a carbonization process, and therefore amorphous carbon layer 45 is formed on catalyst metal layer 40 during the carbonization process. Particularly, the carbonization process may be performed in an atmosphere of a gas mixture containing a predetermined ratio of gases. For example, the atmosphere of the gas mixture may contain carbon monoxide (CO) gas and hydrogen ($H_2$) gas mixed in a ratio of 1:2 to 3:2. However, the gas mixture in the present invention is not limited to these gases. Amorphous carbon layer 45 can be formed by injecting at least one carbon containing gas such as methane ($CH_4$), acetylene ($C_2H_2$), ethylene ($C_2H_4$), ethane ($C_2H_6$), carbon monoxide (CO), or carbon dioxide ($CO_2$) together with at least one of hydrogen ($H_2$) gas, nitrogen ($N_2$) gas, or argon (Ar) gas into a reactor. The carbonization process may be isothermally performed at a temperature of 300° C. to 450° C. for minutes to 60 minutes. More specifically, the carbonization process may be performed at a temperature of about 350° C. for approximately 40 minutes. However, the carbonization process is not limited to the isothermal process. The carbonization process also can be non-isothermally performed.

As a result of the carbonization process, amorphous carbon layer 45 is formed not only on a surface but also inside catalyst metal layer 40. amorphous carbon layer 45 partially penetrates catalyst metal layer 40 forming a mixed layer with catalyst metal layer 40. At this time, a flat shape of the catalyst metal layer 40 is transformed into an arch shape having a non-uniform surface by the penetration of amorphous carbon layer 45. Also, amorphous carbon layer 45 has a high heat absorption rate. Therefore, when a reaction for growing carbon nanotubes takes place, amorphous carbon layer 45 absorbs heat produced in a reactor (not shown), and transmits the heat through catalyst metal layer 40 increasing the surface temperature of catalyst metal layer 40. In this way, low temperature growing of carbon nanotubes practically achieved.

After amorphous carbon layer 45 is formed on catalyst metal layer 40, carbon nanotubes are grown on catalyst metal layer 40 of substrate 10 using a CVD method, as depicted in FIG. 2C. Carbon nanotubes 50 may be grown using a thermal CVD method. However, the method for growing carbon nanotubes in the present invention is not limited to the thermal CVD method. Various methods, which is able to grow carbon nanotubes on a surface of a catalyst metal layer, such as a PECVD method, can be used.

For example, when a thermal CVD method is used to grow carbon nanotubes 50, the carbon nanotube growing process may be performed in a reactor maintained at a temperature of 350° C. to 450° C. under an atmosphere of a gas mixture having a predetermined ratios of gases. For example, the atmosphere of the gas mixture may contain carbon monoxide (CO) gas and hydrogen ($H_2$) gas mixed in a ratio of 1:2 to 3:2. However, the gas mixture in the present invention is not limited to these gases. Carbon nanotubes 50 can be formed by injecting a carbon containing gas such as methane ($CH_4$), acetylene ($C_2H_2$), ethylene ($C_2H_4$), ethane ($C_2H_6$), carbon monoxide (CO), or carbon dioxide ($CO_2$), together with at least one of hydrogen ($H_2$) gas, nitrogen ($N_2$) gas, or argon (Ar) gas into a reactor. The carbon nanotube growing process may be performed isothermally at a temperature of 350° C. to 450° C. for 5 minutes to 60 minutes.

More specifically, as depicted in FIG. 3, the carbon nanotubes growing process may be performed at a temperature of about 420° C. for approximately 10 minutes. However, the carbonization process is not limited to the isothermal process. The carbonization process can be non-isothermally performed. The composition ratio of the gas mixture containing carbon monoxide (CO) gas and hydrogen ($H_2$) gas in the carbonization process and the carbon nanotubes growing process may vary depending on processes and conditions.

As described above, amorphous carbon layer 45 having a high heat absorption rate is formed on a surface of catalyst metal layer 40 and inside catalyst metal layer 40, being partially mixed with catalyst metal layer 40. Therefore, the temperature required for growing carbon nanotubes, which is in a range of 500° C. to 900° C. in conventional carbon nanotubes growing methods, can be significantly reduced, and accordingly, substrate 10 can be formed of sodalime glass (low temperature glass) instead of an expensive high temperature glass, thereby reducing the cost for manufacturing carbon nanotubes 50.

Carbon nanotubes 50 are grown on the surface of catalyst metal layer 40 by the carbon nanotubes growing process described above. When amorphous carbon layer 45 is formed on the surface and inside the catalyst metal layer 40, catalyst metal layer 40 is transformed into a non-uniform surface such as an arch shape or convex shape. Accordingly, as depicted in FIG. 2C, when microscopically observed, carbon nanotubes 50 are vertically grown at the surface of catalyst metal layer 40, but when macroscopically observed, carbon nanotubes 50 are grown in irregular directions because of the non-uniform surface of catalyst metal layer 40.

It should be noted that carbon nanotubes 50 are not grown on the surface of the amorphous carbon layer 45, but grown on the surface of catalyst metal layer 40. Accordingly, carbon nanotubes 50 can be distributed with a predetermined gap therebetween depending on the degree of mixing catalyst metal layer 40 with amorphous carbon layer 45. The activity of catalyst metal layer 40 can be reduced by covering a portion of catalyst metal layer 40 with amorphous carbon layer 45. Thus, the density of carbon nanotubes 50 on the surface of catalyst metal layer 40 can be reduced.

The carbonization process and the carbon nanotube growing process may be isothermally performed. The process for raising temperature from a room temperature to a process temperature, or the process for decreasing temperature from the process temperature to the room temperature may be performed under an atmosphere of nitrogen ($N_2$) gas. FIG. 3 shows an example of carbonization process and carbon nanotube growing process. As depicted in FIG. 3, temperature of a reactor is increased from a room temperature to 350° C., i.e., the carbonization temperature, for 81 minutes under an atmosphere of nitrogen ($N_2$) gas. The carbonization process is performed at 350° C. for 40 minutes. When the carbonization process is completed, the temperature is increased to 420° C., i.e., the carbon nanotubes growing temperature, under the atmosphere of nitrogen ($N_2$) gas for 15 minutes. The carbon nanotube growing process is performed at 420° C. for 10 minutes. When the carbon nanotube growings process is completed, the temperature is decreased to the room temperature for 96 minutes under the atmosphere of nitrogen ($N_2$) gas. The processes shown in FIG. 3 is an example, and the processes and conditions in the present invention are not limited to those of this example shown in FIG. 3. The temperature increase and decrease before and after the carbonization process and the carbon nanotube growing process, respectively, can be performed under an atmosphere of another inert gas such as helium (He) gas, and can be performed for various time periods. In summary, in a method of growing carbon nanotubes of the present embodiment, the density of the carbon nanotubes also can be controlled by controlling the process temperature, process time, and the ratio of gas composition of the carbonization process.

The method of growing carbon nanotubes described above is not limited to the formation of an emitter of a field emission device, which will be described later. Therefore, the conditions for growing the carbon nanotubes, such as the thicknesses of the catalyst metal layer, and the temperature, time, and the ratio of gas composition of the carbonization process may vary according to applications of the carbon nanotubes.

Figure 4A:
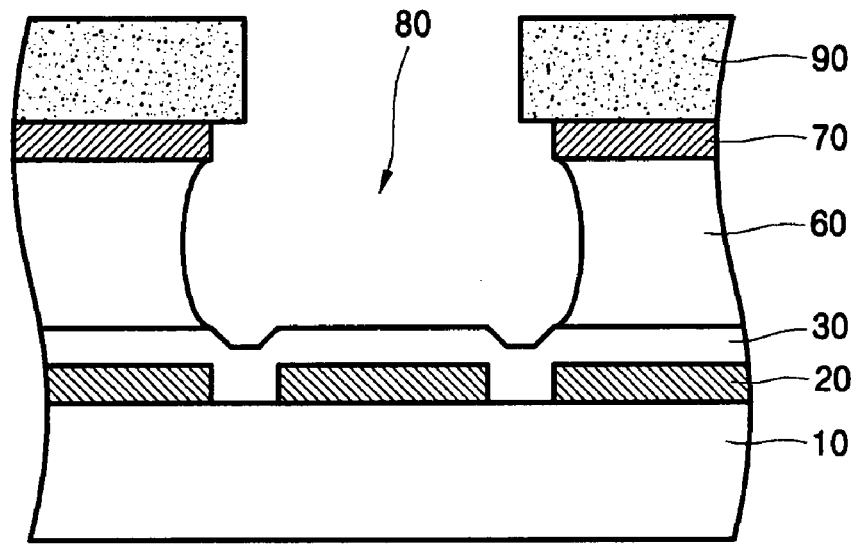
FIGS. 4A through 4D are cross-sectional views for illustrating a method of manufacturing a field emission device according to the principles of the present invention.

A method of manufacturing a field emission device disclosed as an embodiment of the present invention will now be described. FIGS. 4A through 4D are cross-sectional views for illustrating a method of manufacturing a field emission device built as an embodiment of the present invention. FIG. 4A shows a structure of a panel that includes negative electrode 20, silicon layer 30, gate electrode insulating layer 60, gate electrode 70, and photoresist layer 90 which are formed on an upper surface of substrate 10. For example, after patterning a molybdenum (Mo) or chromium (Cr) electrode on the upper surface of glass substrate 10, amorphous silicon (Si) layer 30 covering the patterned electrode may be formed. Silicon layer 30, however, may not be formed if silicon layer 30 is not required. Gate electrode insulating layer 60 is formed on silicon layer 30. Gate electrode insulating layer 60 is made of an insulating material such as silicon dioxide ($SiO_2$). Gate electrode 70 patterns are made after depositing a metal such as chromium (Cr) on gate electrode insulating layer 60. Well 80 is formed through gate electrode 70 and gate electrode insulating layer 60 at a predetermined location. Silicon layer 30 or negative electrode 20, if there is no silicon layer 30, is exposed at the bottom of well 80.

Figure 4B:
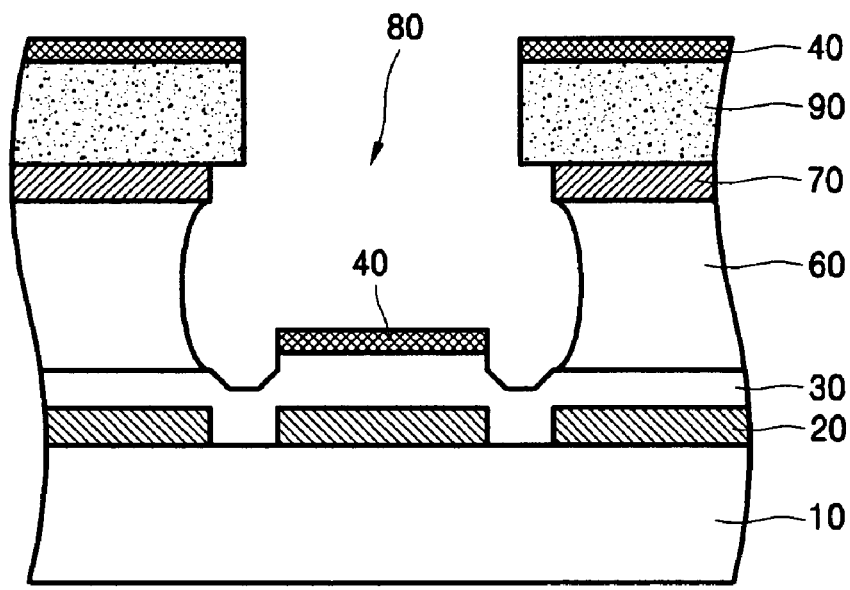

As depicted in FIG. 4B, catalyst metal layer 40 is deposited on the panel made through processes described above. Catalyst metal layer 40 is deposited on photoresist layer 90 as well as on silicon layer 30 exposed on the bottom of the well 80, or on negative electrode 20 if there is no silicon layer 30. As described above, catalyst metal layer 40 is formed of a material containing a nickel (Ni), iron (Fe), cobalt (Co), etc., or alloys of these metals. The deposition method of catalyst metal layer 40 may be a magnetron sputtering method or an electron beam deposition method.

Figure 4C:
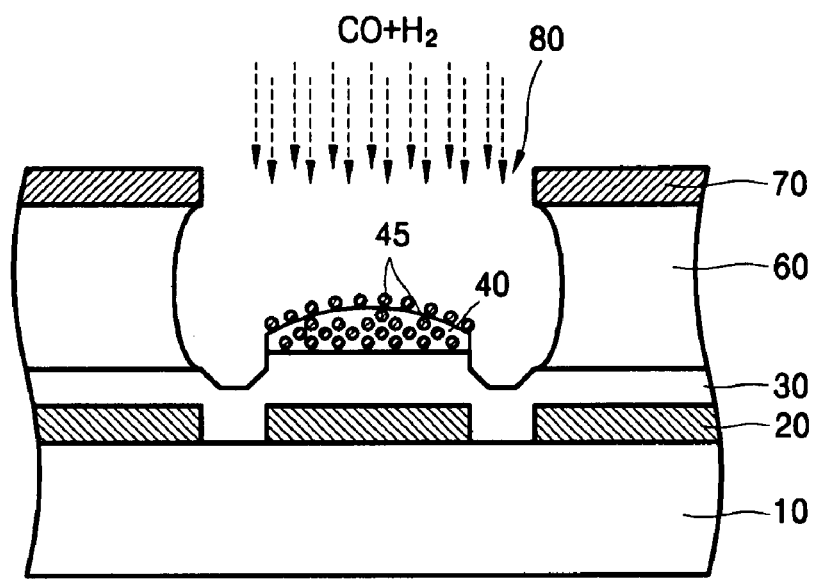

As depicted in FIG. 4C, amorphous carbon layer 45 is formed on catalyst metal layer 40. Amorphous carbon layer 45 can be formed by the carbonization process described above. In order to selectively deposit catalyst metal layer 40 and amorphous carbon layer 45 on a surface of silicon layer 30 or negative electrode 20, a photoresist lift-off method may be used to remove photoresist layer 90 and catalyst layer 40 formed on the top of photoresist layer 90.

Carbon nanotubes 50 are grown on a surface of catalyst metal layer 40 where amorphous carbon layer 45 is formed. Carbon nanotubes 50 may be grown using the thermal CVD method described above. That is, the carbon growing process is isothermally performed at a temperature of 350° C. to 450° C. for 5 to 60 minutes. More specifically, the temperature is approximately 420° C. and time for carbon nanotube growing process is approximately 10 minutes.

As described above, amorphous carbon layer 45 having a high heat absorption rate is formed, partially covering catalyst metal layer 40 and partially penetrating catalyst metal layer 40. Therefore, the temperature required for growing carbon nanotubes, which is in a range of 500° C. to 900° C. in conventional methods, can be significantly reduced, and accordingly, substrate 10 can be formed of sodalime glass instead of an expensive high temperature glass, thereby reducing cost for manufacturing carbon nanotubes 50. Accordingly, a large size field emission device having the carbon nanotubes emitter can be readily manufactured. Also, the problem of peeling-off or damage of thin films such as gate electrode insulating layer 60, which occurs when substrate 10 is processed at a high temperature greater than 500° C., can be solved.

Figure 4D:
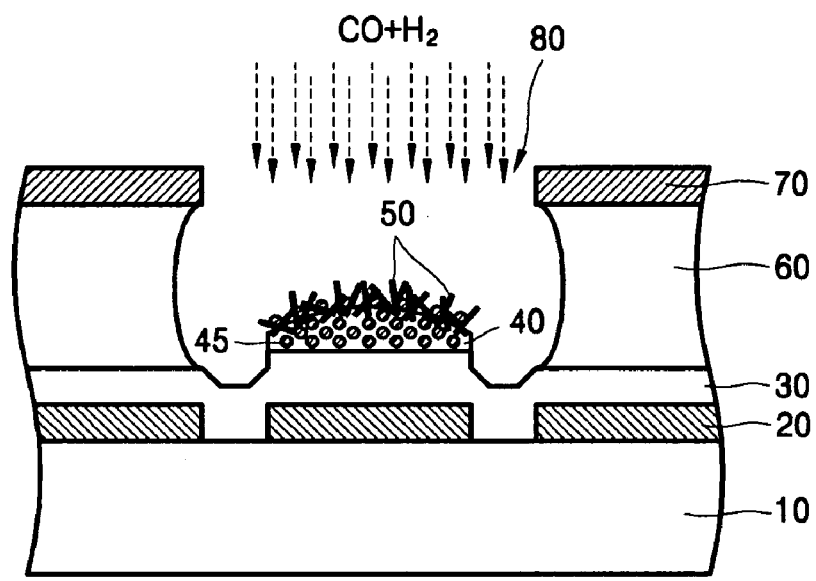

As depicted in FIG. 4D, carbon nanotubes 50 are grown on a portion of the surface of catalyst metal layer 40 that is not covered by amorphous carbon layer 45. Carbon nanotubes 50 are distributed with a predetermined gap from each other, and therefore carbon nanotubes 50 could be formed with a low density on the surface of catalyst metal layer 40. When carbon nanotubes 50 are used for an emitter of a field emission device, a carbon nanotubes emitter, having superior field emission characteristics, is provided, because the carbon nanotubes emitter provides the improved field enhancement and current density.

Figure 5A:
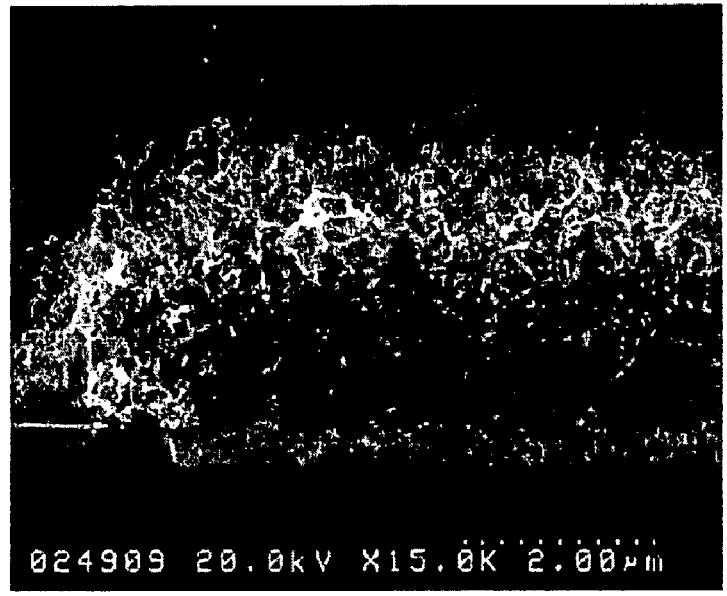
FIG. 5A is a SEM image of a carbon nanotube emitter of a field emission device formed by a CVD method according to the principles of the present invention.
Figure 5B:
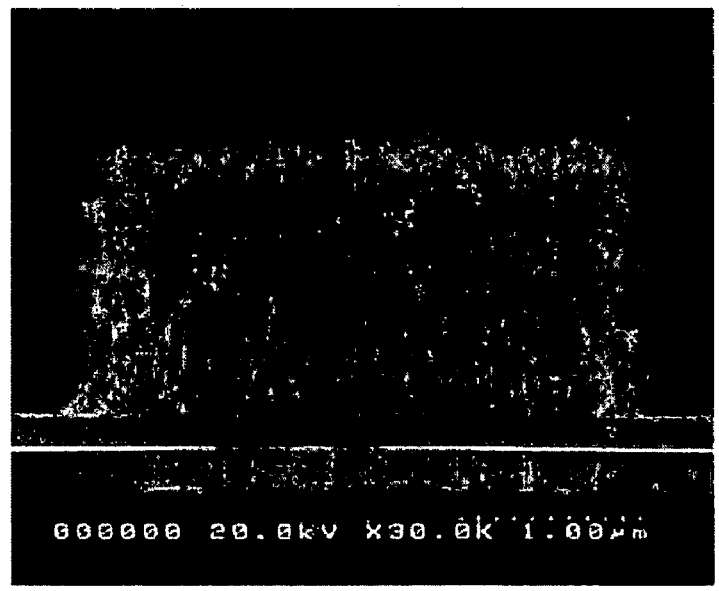
FIG. 5B is a SEM image of a carbon nanotube emitter of a field emission device formed using a CVD method as a comparative example to FIG. 5A.

FIG. 5A is a SEM image of a carbon nanotube emitter of a field emission device formed by a CVD method according to the principles of the present invention, and FIG. 5B is a SEM image of a carbon nanotube emitter of a field emission device formed using a conventional CVD method as a comparative example to FIG. 5A. The SEM image of FIG. 5B is an example of carbon nanotubes grown substantially without a carbonization process. The SEM image of FIG. 5A shows carbon nanotubes grown at a temperature of about 420° C. after catalyst metal layer 40 is carbonized at a temperature of about 350° C. for approximately 40 minutes.

As depicted in FIG. 5A, when carbon nanotubes 50 are grown on catalyst metal layer 40 using a CVD method after catalyst metal layer 40 is carbonized, the density of carbon nanotubes 50 is remarkably reduced compared to the density of the carbon nanotubes shown in FIG. 5B. That is, gaps between carbon nanotubes 50 are increased. FIG. 5A also shows that carbon nanotubes 50 are in disorder. The disorder of carbon nanotubes 50 is caused by the non-uniform surface of catalyst metal layer 40 that is produced when amorphous carbon layer 45 is formed on the surface and inside catalyst metal layer 40.

The present invention provides a method of growing carbon nanotubes at a low temperature. The present invention provides a method of growing carbon nanotubes, in which the density of the carbon nanotubes can be controlled. The present invention provides a method of growing carbon nanotubes at low costs. The present invention provides a method of manufacturing a field emission device, in which peeling-off or damages of thin films such as a gate electrode insulating film can be prevented during a thermal process. The present invention also provides an inexpensive method of manufacturing a field emission device in a large size by growing carbon nanotubes at a low temperature, the field emission device having superior field emission characteristics by controlling the density of a carbon nanotubes of the emitter.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of growing carbon nanotubes, comprising:
   preparing a substrate;
   forming a catalyst metal layer on the substrate to promote growing of carbon nanotubes;
   forming an amorphous carbon layer on the catalyst metal layer, the amorphous carbon layer partially covering the catalyst metal layer; and
   growing carbon nanotubes from a surface of the catalyst metal layer, the carbon nanotubes being grown on a portion of the surface of the catalyst metal layer that is not covered by the amorphous carbon layer.

2. The method of claim 1, comprised of the step of preparing the substrate including a step of forming a silicon layer on the substrate.

3. The method of claim 1, comprised of the substrate being made of glass.

4. The method of claim 1, comprised of the step of growing the carbon nanotubes including a process of chemical vapor deposition.

5. The method of claim 1, comprised of the step of forming the amorphous carbon layer including a step of carbonizing the catalyst metal layer.

6. The method of claim 5, comprised of the step of carbonizing the catalyst metal layer including a step of injecting a gas mixture into a reactor where the substrate is placed, the gas mixture including a predetermined ratio of carbon monoxide gas to hydrogen gas.

7. The method of claim 5, comprised of the step of carbonizing the catalyst metal layer being performed at a temperature between about 300° C. and about 450° C. for about 5 minutes to about 60 minutes.

8. The method of claim 5, wherein the step of carbonizing the catalyst metal layer and the step of growing the carbon nanotubes are isothermally performed.

9. The method of claim 8, further comprising:
injecting a nitrogen gas into a reactor where the substrate is placed;
changing temperature of the reactor to a carbonization temperature while containing the nitrogen gas in the reactor, before the step of carbonizing the catalyst metal layer;
changing temperature of the reactor to a carbon nanotube growing temperature while containing the nitrogen gas in the reactor, before the step of growing the carbon nanotubes; and
changing temperature of the reactor to a predetermined temperature while containing the nitrogen gas in the reactor, after the step of growing the carbon nanotubes.

10. The method of claim 9, wherein the carbon nanotube growing temperature is between about 350° C. and about 450° C., and the step of growing the carbon nanotubes is performed for about 5 minutes to about 60 minutes.

11. The method of claim 1, wherein the catalyst metal layer is formed of a material selected from the group consisting of nickel, iron, cobalt, platinum, molybdenum, tungsten, yttrium, gold, palladium, and alloys thereof.

12. The method of claim 1, wherein the catalyst metal layer is formed by a magnetron sputtering method or an electron beam evaporation method.

13. A method of manufacturing a field emission device, comprising:
preparing a panel that includes a substrate, a negative electrode formed on the substrate, a gate electrode insulating layer formed on the negative electrode, and a gate electrode formed on the gate electrode insulating layer;
forming a well through the gate electrode and the gate electrode insulating layer until the negative electrode is exposed at a bottom of the well;
forming a catalyst metal layer on the negative electrode to promote growing of carbon nanotubes;
forming an amorphous carbon layer on the catalyst metal layer, the amorphous carbon layer partially covering the catalyst metal layer; and
forming a carbon nanotube emitter by growing carbon nanotubes from a surface of the catalyst metal layer, the carbon nanotubes being grown on a portion of the surface of the catalyst metal layer that is not covered by the amorphous carbon layer.

14. The method of claim 13, comprised of the substrate being made of glass.

15. The method of claim 13, comprised of the step of growing the carbon nanotubes including a process of chemical vapor deposition.

16. The method of claim 13, comprised of the step of forming the amorphous carbon layer including a step of carbonizing the catalyst metal layer.

17. The method of claim 16, comprised of the step of carbonizing the catalyst metal layer including a step of injecting a gas mixture into a reactor where the substrate is placed, the gas mixture including a predetermined ratio of carbon monoxide gas to hydrogen gas.

18. The method of claim 16, wherein the step of carbonizing the catalyst metal layer and the step of growing the carbon nanotubes are isothermally performed.

19. The method of claim 18, further comprising:
injecting a nitrogen gas into a reactor where the substrate is placed;
changing temperature of the reactor to a carbonization temperature while containing the nitrogen gas in the reactor, before the step of carbonizing the catalyst metal layer;
changing temperature of the reactor to a carbon nanotube growing temperature while containing the nitrogen gas in the reactor, before the step of growing the carbon nanotubes; and
changing temperature of the reactor to a predetermined temperature while containing the nitrogen gas in the reactor, after the step of growing the carbon nanotubes.

20. The method of claim 19, wherein the carbonization temperature is between about 300° C. and about 450° C., and the step of carbonizing the catalyst metal layer is performed for about 5 minutes to about 60 minutes.

21. The method of claim 19, wherein the carbon nanotube growing temperature is between about 350° C. and about 450° C., and the step of growing the carbon nanotubes is performed for about 5 minutes to about 60 minutes.

22. The method of claim 13, wherein the catalyst metal layer is formed of a material selected from the group consisting of nickel, iron, cobalt, platinum, molybdenum, tungsten, yttrium, gold, palladium, and alloys thereof.

23. The method of claim 13, wherein the catalyst metal layer is formed by a magnetron sputtering method or an electron beam evaporation method.

24. A method of manufacturing a field emission device, comprising:
preparing a panel that includes a substrate, a negative electrode formed on the substrate, a silicon layer formed on the negative electrode, a gate electrode insulating layer formed on the silicon layer, and a gate electrode formed on the gate electrode insulating layer;
forming a well through the gate electrode and the gate electrode insulating layer until the silicon layer is exposed at a bottom of the well;
forming a catalyst metal layer on the silicon layer to promote growing of carbon nanotubes;
forming an amorphous carbon layer on the catalyst metal layer, the amorphous carbon layer partially covering the catalyst metal layer; and
forming a carbon nanotube emitter by growing carbon nanotubes from a surface of the catalyst metal layer, the carbon nanotubes being grown on a portion of the surface of the catalyst metal layer that is not covered by the amorphous carbon layer.

* * * * *